US011160140B2

(12) United States Patent
Qiu

(10) Patent No.: US 11,160,140 B2
(45) Date of Patent: Oct. 26, 2021

(54) ELECTRONIC CIGARETTE WITH AT LEAST TWO OUTPUT MODES AND METHOD FOR CONTROLLING THE ELECTRONIC CIGARETTE

(71) Applicant: Joyetech (Changzhou) Electronics Co., Ltd., Changzhou (CN)

(72) Inventor: Wei-Hua Qiu, ChangZhou (CN)

(73) Assignee: Joyetech (Changzhou) Electronics Co., Ltd., Changzhou (CN)

( * ) Notice: Subject to any disclaimer, the term of this patent is extended or adjusted under 35 U.S.C. 154(b) by 338 days.

(21) Appl. No.: 16/108,306

(22) Filed: Aug. 22, 2018

(65) Prior Publication Data

US 2018/0352870 A1 Dec. 13, 2018

Related U.S. Application Data

(63) Continuation-in-part of application No. 14/977,668, filed on Dec. 22, 2015, now Pat. No. 10,085,483, which is a continuation-in-part of application No. PCT/CN2015/081478, filed on Jun. 15, 2015.

(30) Foreign Application Priority Data

Jun. 19, 2014 (CN) ........................ 201410277706.2

(51) Int. Cl.

| | |
|---|---|
| ***H05B 1/02*** | (2006.01) |
| ***H02J 7/00*** | (2006.01) |
| ***A24F 40/53*** | (2020.01) |
| ***A24F 40/60*** | (2020.01) |
| ***A24F 40/10*** | (2020.01) |

(52) U.S. Cl.

CPC .......... *H05B 1/0227* (2013.01); *A24F 40/53* (2020.01); *A24F 40/60* (2020.01); *H02J 7/00* (2013.01); *H05B 1/0244* (2013.01); *A24F 40/10* (2020.01)

(58) Field of Classification Search

None

See application file for complete search history.

(56) References Cited

U.S. PATENT DOCUMENTS

| | | | | |
|---|---|---|---|---|
| 9,408,416 | B2 * | 8/2016 | Monsees | F21V 33/0004 |
| 9,675,114 | B2 * | 6/2017 | Timmermans | A24F 40/50 |
| 9,861,772 | B2 * | 1/2018 | Terry | A61M 11/042 |
| 10,398,175 | B2 * | 9/2019 | Thorens | A24F 40/53 |
| 2014/0041655 | A1 * | 2/2014 | Barron | A24F 40/46 128/202.21 |
| 2015/0122252 | A1 * | 5/2015 | Frija | A61M 15/06 128/202.21 |
| 2015/0257447 | A1 * | 9/2015 | Sullivan | A61M 15/0086 131/329 |
| 2016/0331035 | A1 * | 11/2016 | Cameron | G08C 17/02 |
| 2017/0143043 | A1 * | 5/2017 | Liu | H05B 1/0244 |
| 2018/0013175 | A1 * | 1/2018 | Liu | A24F 40/40 |

* cited by examiner

*Primary Examiner* — Thor S Campbell

(74) *Attorney, Agent, or Firm* — ScienBiziP, P.C.

(57) ABSTRACT

A method for controlling an electronic cigarette with at least two output modes includes detecting whether a switch signal for the stored output modes is input when the electronic cigarette is in a locked state. The stored output mode is switched in response to the switch signal. The electronic cigarette is controlled to operate according to the stored output mode, and an output of the electronic cigarette is controlled in response to a smoking request signal when the electronic cigarette is unlocked. The user can select a desired output mode according to need, there increasing the user experience.

17 Claims, 3 Drawing Sheets

Start
10 Power on and initialize system
101 Is USB inserted? — yes → 102 Enter a charging state
no
11 Is a lock-out signal input? — yes → 12 Enter a locked state
13 Is a switch signal input? — yes → 14 Switch stored output mode; no → 15 Is a unlock signal input? — yes → 16 Unlock the electronic cigarette; no
no
17 Is a smoking request signal input? — no → 18 Enter a low power consumption state; yes → 19 Operate according to stored output mode and control output
End

ELECTRONIC CIGARETTE WITH AT LEAST TWO OUTPUT MODES AND METHOD FOR CONTROLLING THE ELECTRONIC CIGARETTE

CROSS-REFERENCE TO RELATED APPLICATIONS

The subject matter herein generally relates to electronic cigarettes. This application is a continuation application of U.S. patent application with Ser. No. 14/977,668, filed on Dec. 22, 2015, which claims priority to CN patent application with Ser. No. 201410277706.2, filed on Jun. 19, 2014, the disclosure of which is incorporated herein by reference.

FIELD

The present disclosure relates to an electronic cigarette with at least two output modes and a method for controlling the electronic cigarette.

BACKGROUND

Output voltages of electronic cigarettes are often constant (for example, 3.3 volts). When an electronic cigarette is working under a constant voltage output mode, and the load to which the output voltage is provided remains unchanged, a coil in the electronic cigarette generates more heat as the output voltage increases. In turn, the vapor flow becomes hotter, thus, providing a user with a different experience. In contrast, less airflow is generated when the output voltage of the electronic cigarette is lower, thus, not providing the user with a different experience. In addition, the resistance of the coil is not detected under the constant voltage output mode. If the resistance of the coil is low but the output voltage is high, a dry-burn effect will occur in the coil. If the resistance of the coil is high but the output voltage is low, the amount of vapor flow generated during smoking is decreased.

BRIEF DESCRIPTION OF THE DRAWINGS

Implementations of the present disclosure will now be described, by way of example only, with reference to the attached figures.

DETAILED DESCRIPTION

Figure 1:
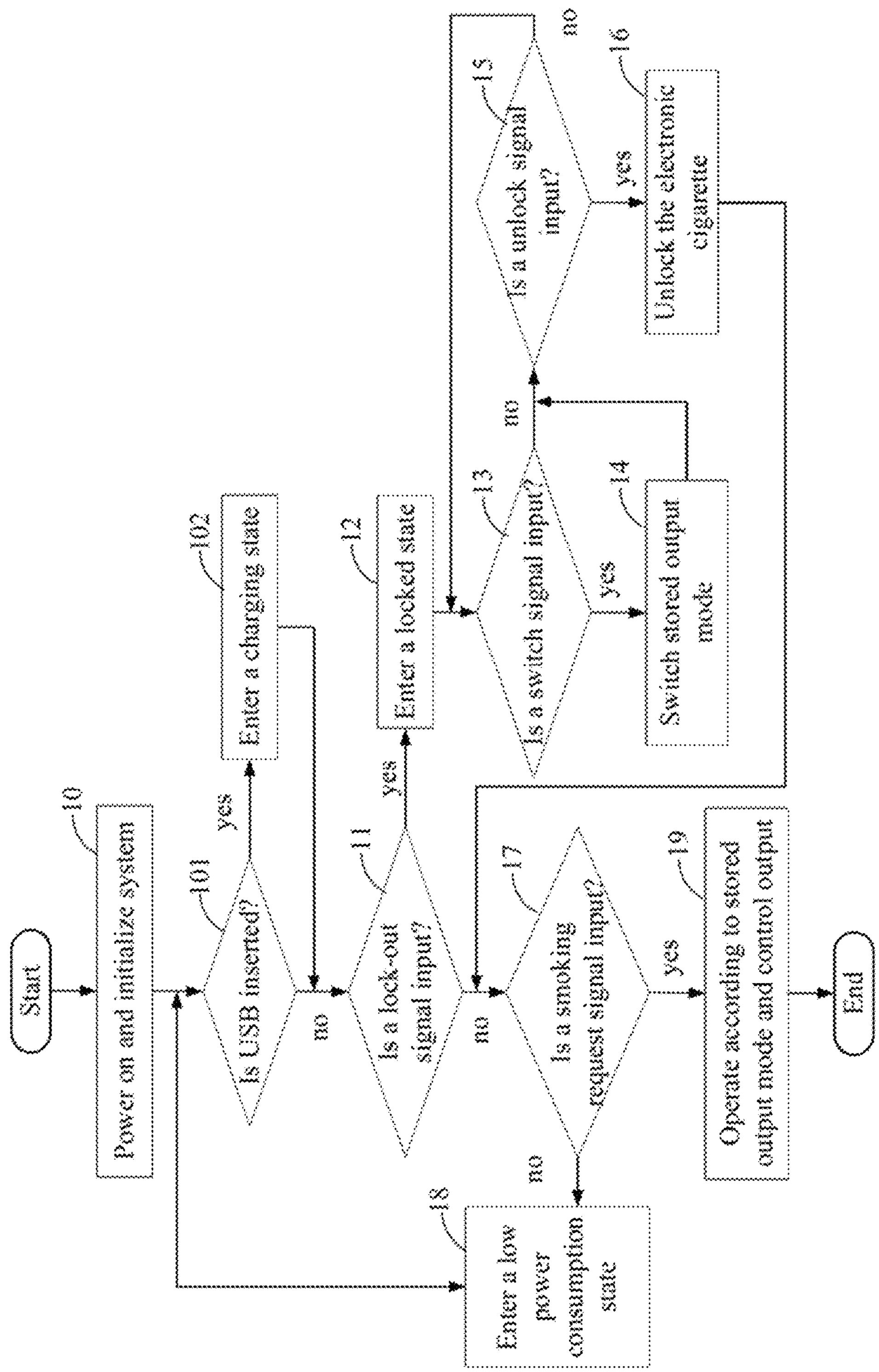
FIG. 1 is a flowchart of an embodiment of a method for controlling an electronic cigarette with at least two output modes.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Furthermore, the word "controller," as used hereinafter, refers to logic embodied in hardware or firmware, or to a collection of software instructions, written in a programming language, such as, for example, Java, C, or assembly. One or more software instructions in the controllers may be embedded in firmware. It will be appreciated that controllers may comprise connected logic units, such as gates and flip-flops, and may comprise programmable units, such as programmable gate arrays or processors. The controllers described herein may be implemented as either software and/or hardware controllers and may be stored in any type of non-transitory computer-readable storage medium or other computer storage device.

Figure 3:
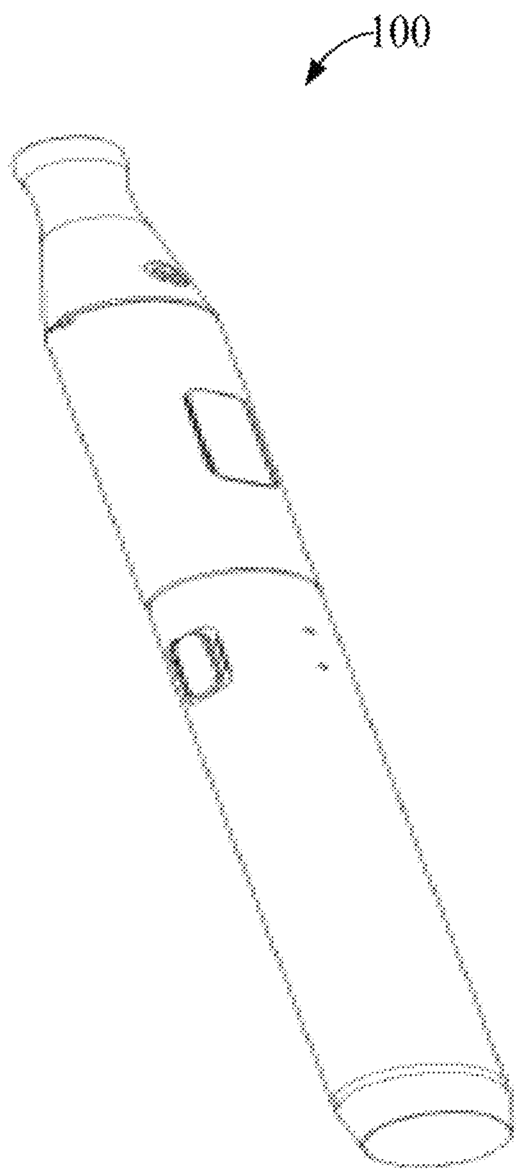
FIG. 3 is an isometric view of an embodiment of an electronic cigarette with at least two output modes.

FIG. 1 illustrates a method controlling an electronic cigarette 100 with at least two output modes (an isometric view of an embodiment of the electronic cigarette 100 is shown in FIG. 3). The output modes include, but are not limited to, a voltage output mode and a power output mode. One of the output modes is stored in a memory 30 of the electronic cigarette 100. The electronic cigarette 100 can operate according to the stored output mode. The method is provided by way of example, as there are a variety of ways to carry out the method. Each block shown in FIG. 1 represents one or more processes, methods, or subroutines, carried out in the example method. Furthermore, the illustrated order of blocks is illustrative only and the order of the blocks can be changed. Additional blocks can be added or fewer blocks may be utilized, without departing from this disclosure. The example method can begin at block 10.

At block 10, the electronic cigarette 100 is powered on and initialized.

Figure 2:
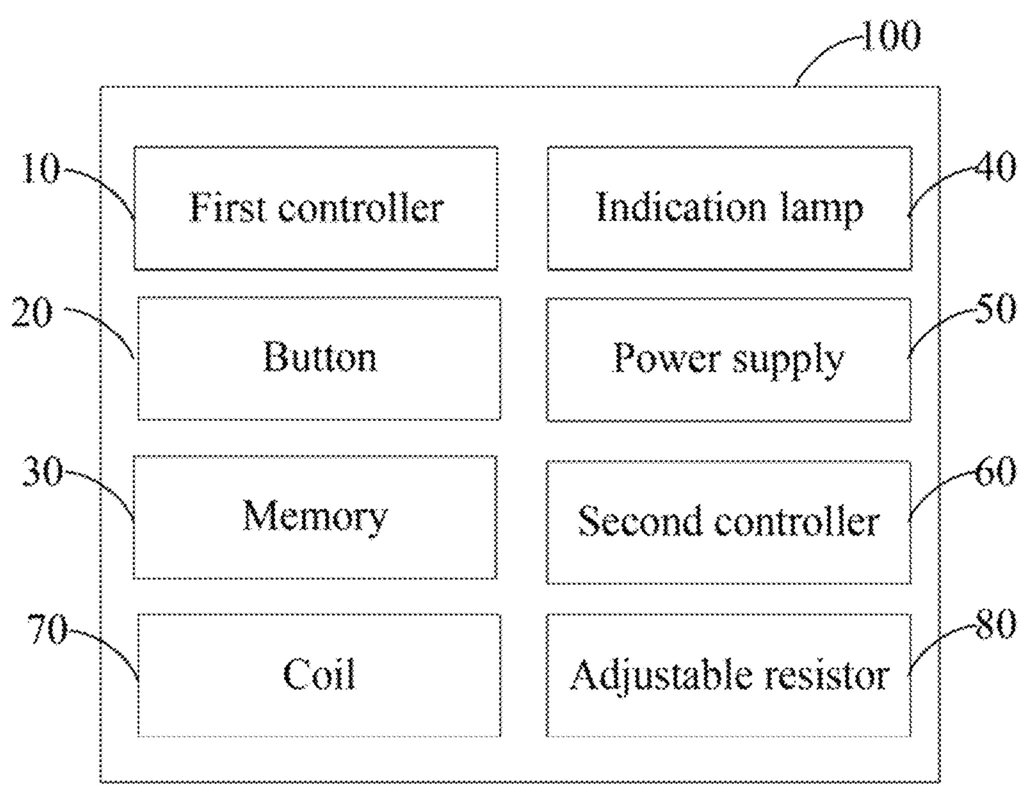
FIG. 2 is a block diagram of an embodiment of an electronic cigarette with at least two output modes.

At block 11, referring to FIG. 2, a first controller 10 determines whether a lock-out signal $S_1$ is input. If yes, the procedure proceeds to block 12. Otherwise, the procedure proceeds to block 17.

In an embodiment, the electronic cigarette 100 includes at least one button 20. The lock-out signal $S_1$ can be successive button signals that are input for a first preset number of times (for example, N times, N equals to 5) through a button 20. In another embodiment, the lock-out signal $S_1$ can also be input by user's voice or a touch panel (not shown) of the electronic cigarette 100.

At block 12, the first controller 10 locks out the electronic cigarette 100. Only when the electronic cigarette 100 is locked out (that is, in a locked state), switching for the output modes can be implemented, to avoid incorrect operations. However, the user is not allowed to smoke the electronic cigarette 100 when the electronic cigarette 100 is in the locked state.

In another embodiment, blocks 11 and 12 can be omitted when the locked state is a default state of the electronic cigarette 100. That is, the electronic cigarette 100 can automatically enter the locked state when powered on.

At block 13, the first controller 10 detects whether a switch signal $S_2$ for the stored output modes is input under the locked state. If yes, the procedure proceeds to block 14. Otherwise, the procedure proceeds to block 15.

The switch signal $S_2$ for the stored output modes can be divided into three types. The first type of switch signal $S_2$ is configured to switch the stored output mode to another output mode. For example, when the stored output mode is the voltage output mode, the first type of switch signal $S_2$ can switch the stored output mode to the power output mode. The second type of switch signal $S_2$ is configured to switch or vary an output of stored output mode. The output can be an output voltage of the voltage output mode or an output power of the voltage output mode. For example, when stored output mode is the power output mode with an output power of about 100 Watt, the second type of switch signal $S_2$ can switch or change the output power of the stored output mode to 110 Watt. In addition, the electronic cigarette 100 includes at least two indication lamps 40. Each voltage output mode corresponds to at least one indication lamp 40. The third type of switch signal $S_2$ is configured to switch a state of the indication lamp 40 corresponding to the stored output mode. The state of the indication lamp 40 can be a color or an On/Off state of the indication lamp 40. However, the switch signal $S_2$ is not limited to the three types as described and can be varied.

In an embodiment, the switch signal $S_2$ for the stored output mode can be a button signal that is input by pressing a button 20 for a time period greater than or equal to a first preset time period (for example, A seconds). In another embodiment, the switch signal $S_2$ for the output modes can also be input through the user's voice or the touch panel of the electronic cigarette 100.

The memory 30 can be embedded in the first controller 10. The memory 30 can also be an external storage device that is independent from the first controller 10.

At block 14, the first controller 10 switches the stored output mode in response to the switch signal $S_2$. Then, the procedure proceeds to block 15.

In an embodiment, when the switch signal $S_2$ is the first type of the switch signal, the first controller 10 switches the stored output mode in the memory 30 to another output mode in response to the first type of the switch signal $S_2$. For example, when the electronic cigarette 100 is powered on, the initial output mode stored in the memory 30 is the voltage output mode. The first controller 10 varies the stored output mode to the power output mode in response to the first type of the switch signal $S_2$. Furthermore, after the stored output mode has been switched, the first controller 10 can further control the indication lamp 40 corresponding to the current stored output mode to emit light. The indication lamp 40 can be, but is not limited to, a light emitting diode (LED). In an embodiment, the electronic cigarette 100 includes a symbolic identifier "VV" corresponding to the voltage output mode. The symbolic identifier "VV" further corresponds to one indication lamp 40. When the indication lamp 40 corresponding to the symbolic identifier "VV" emits light, the current output mode is indicated as the voltage output mode. The electronic cigarette 100 further includes a symbolic identifier "VW" corresponding to the power output mode. The symbolic identifier "VW" corresponds to another indication lamp 40. When the indication lamp 40 corresponding to the symbolic identifier "VW" emits light, the current output mode is indicated as the power output mode. The user can intuitively select a desired output mode according to the indication from the two indication lamps 40. In another embodiment, the current output mode can also be indicated by other types of indication information such as graphic icons, audios, or texts. That is, the indication information corresponding to the stored output mode is output to the user after the stored output mode has been switched.

When the switch signal $S_2$ is the second type of switch signal $S_2$, the first controller 10 switches or varies the output of the stored output mode in the memory 30 in response to the second type of switch signal $S_2$.

At block 15, the first controller 10 detects whether an unlock signal $S_3$ is input. If no, block 13 is repeated. Otherwise, the procedure proceeds to block 16.

In an embodiment, the unlock signal $S_3$ can be successive button signals that are input for a second preset number of times (for example, M times, M equals to 5) through a button 20. The second preset number of times may be the same as the first preset number of times, and may also be different from the first preset number of times. In another embodiment, the unlock signal $S_3$ can also be input by the user's voice or the touch panel of the electronic cigarette 100.

At block 16, the first controller 10 unlocks the electronic cigarette 100 (that is, the electronic cigarette 100 is in an unlocked state). When the electronic cigarette 100 is unlocks, the user can smoke the electronic cigarette 100 by operating a button 20. Then, the procedure proceeds to block 17.

At block 17, the first controller 10 detects whether a smoking request signal $S_4$ is input. If no, the procedure proceeds to block 18. If yes, the procedure proceeds to block 19.

In an embodiment, the smoking request signal $S_4$ is a button signal that is input by pressing a button 20 once when the electronic cigarette 100 in the unlocked state. The button 20 for inputting the lock-out signal $S_1$, the button 20 for inputting the switch signal $S_2$, the button 20 for inputting the unlock signal $S_3$, and the button 20 for inputting the smoking request signal $S_4$ may be the same button. Different signals are distinguish from each other by pressing the same button through different ways.

At block 18, the first controller 10 controls the electronic cigarette 100 to enter a low power consumption state.

At block 19, the first controller 10 controls the electronic cigarette 100 to operate according to the stored output mode, and controls the output of the electronic cigarette 100 according to a detection signal $S_5$ from a second controller 60.

In an embodiment, the detection signal $S_5$ includes a voltage adjusting signal that relates to a desired output voltage set by the user. The first controller 10 controls the output voltage of a power supply 50 of the electronic cigarette 100 according to the output voltage set by the user. For the voltage output mode, the output voltage is constant. Only when the user inputs the voltage adjusting signal can the output voltage be varied according to the desired output voltage set by the user. For example, a current output voltage for the voltage output mode is 4V. When the user inputs a voltage adjusting signal relating to a desired output voltage of 3.5V, the output voltage is varied from 4V to 3.5 V. As for the power output mode, the output power is constant and depends on the output voltage. The output power can be varied by adjusting the output voltage. That is, when the user inputs the voltage adjusting signal, the output power can be varied according to the desired output voltage set by the user. For example, a current output power of the power output mode is 4 W. When the user inputs a power adjusting signal relating to a desired output power of 3.5 W, the corresponding output voltage is calculated according to the desired output power and the resistance of the coil 70. Then, the output voltage is adjusted accordingly to allow the output power to be varied from 4 W to 3.5 W.

The detection signal $S_5$ may also include a voltage detection signal for detecting an output voltage of the power supply of the electronic cigarette 100. The electronic cigarette 100 further includes a second controller 60. The second controller 60 converts the detected output voltage of the voltage detection signal $S_5$ to an actual output voltage, and transmits the actual output voltage to the first controller 10. In an embodiment, the electronic cigarette 100 further includes a voltage comparator (not shown) that provides the second controller 60 with a standard voltage. The second controller 60 compares the detected output voltage with the standard voltage to determine the actual output voltage of the power supply 50. The first controller 10 further determines whether the actual output voltage is high enough to heat a coil 70 of the electronic cigarette 100 that is configured to heat the liquid solution. When the actual output voltage is high enough to heat the coil 70, the first controller 10 controls the indication lamp 40 corresponding to the current output mode to emit light with a breathing frequency to indicate the current remaining voltage of the power supply 50, and in this condition the user can smoke. The lower the breathing frequency of the indication lamp 40, the higher the current remaining voltage of the power supply 50. The greater the breathing frequency of the indication lamp 40, the faster the remaining voltage of the power supply 50 will be exhausted. When the actual output voltage is less than or equal to a preset voltage (for example, 3.3V), the first controller 10 controls the electronic cigarette 100 to stop operating.

In another embodiment, after the electronic cigarette 100 is powered on (block 10), the procedure proceeds to block 101. At block 101, the first controller 10 further determines whether the USB connector is connected to a charger (not shown). If yes, the procedure proceeds to block 102. Otherwise, the procedure proceeds to block 11.

At block 102, the first controller 10 controls the electronic cigarette 100 to enter a charging state. In addition, the second controller 60 further detects whether the coil 70 configured to heat the liquid solution breaks down. That is, the second controller 60 detects whether the coil 70 is in a short circuit condition, or whether a resistance of the coil 70 is too low. When the coil 70 breaks down, the first controller 10 controls the electronic cigarette 100 to stop operating. During smoking, when a time period for pressing a button 20 is greater than a second preset time period (for example, P seconds, P equals 10), the first controller 10 controls the electronic cigarette 100 to stop operating, and further generates a warning signal to warn the user, thereby protecting the coil 70 from being damaged.

According to the above embodiment, the adjustment of the output voltage and the determination of the remaining voltage of the power supply 50 are performed by the first controller 10 and the second controller 60, respectively. In other embodiment, the above function can also be performed only by the first controller 10. The function is not limited to be performed by one or two controllers.

FIG. 2 illustrates an embodiment of an electronic cigarette 100 with at least two output modes. The electronic cigarette 100 includes at least one button 20, a first controller 10, and a memory 30.

The memory 30 stores one of the output modes. The button 20 is for inputting a switch signal $S_2$ for the output modes. The first controller 10 switches the stored output modes in response to the switch signal $S_2$ when the electronic cigarette 100 is in the locked state. The first controller 10 further control the electronic cigarette 100 to operate according to the stored output mode and control an output of the electronic cigarette in response to a smoking request signal $S_4$ when the electronic cigarette 100 is unlocked.

The electronic cigarette 100 can further include a power supply 50, a second controller 60 and an adjustable resistor 80. The adjustable resistor 80 can be adjusted to input a voltage adjusting signal relating to a desired output voltage set by the user. The second controller 60 processes the voltage adjusting signal. The first controller 10 further controls the output of the power supply 50 according the output voltage set by the user in response to the voltage adjusting signal from the second controller 60. The power supply 50 may be a rechargeable battery or a non-rechargeable battery.

With the above configuration, the power output mode is added to the electronic cigarette 100. When the user smokes the electronic cigarette 100 under the power output mode, regardless of the resistance of the coil 70 and the output voltage, the user can obtain a preferred amount of airflow (e.g., an amount of airflow the user desires) based on a constant output power. As for a constant output power (which is corresponding to the amount of airflow), the electronic cigarette 100 can automatically adjust the output voltage according to the resistance of the coil 70, thus preventing a short-circuit effect from being generated in the coil 70. Therefore, the user can select a preferred output mode (e.g., user-desired output mode), and also can select a preferred output mode (e.g., user-desired output mode) by switching between the output modes during smoking, thus increasing the diversity of options. The user experience and the quality of the electronic cigarette 100 can also be improved.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for controlling an electronic cigarette with at least two output modes, one of the output modes stored in a memory of the electronic cigarette, the method comprising:

detecting whether a switch signal for the stored output modes is input when the electronic cigarette is in a locked state;

switching the stored output mode in response to the switch signal; and controlling the electronic cigarette to operate according to the stored output mode after being switched, and controlling an output of the electronic cigarette in response to a smoking request signal when the electronic cigarette is unlocked;

wherein the output of the electronic cigarette is controlled according to a detection signal, the detection signal comprises a voltage detection signal for detecting an output voltage of a power supply of the electronic cigarette, the method further comprises:

converting the detected output voltage of the voltage detection signal to an actual output voltage; and determining whether the actual output voltage is high enough to heat a coil of the electronic cigarette configured to heat the liquid solution.

2. The method of claim 1, further comprising:

detecting whether an unlock signal is input when the switch signal is not input; and unlocking the electronic cigarette when the unlock signal is input, and detecting the switch signal again when the unlock signal is not input.

3. The method of claim 1, wherein the switch signal for the stored output modes is a button signal that is input by pressing a button of the electronic cigarette for a time period greater than or equal to a first preset time period.

4. The method of claim 1, wherein each output mode corresponds to one indication information, the method further comprises:

outputting the indication information corresponding to the stored output mode after the stored output mode being switched.

5. The method of claim 4, wherein the electronic cigarette comprises at least two indication lamps, each output mode corresponds to at least one indication lamp, the indication information is output by controlling the indication lamp corresponding to the stored output mode to emit light.

6. The method of claim 1, further comprising:

controlling the electronic cigarette to enter a low power consumption state when the smoking request signal is not input.

7. The method of claim 1, wherein the detection signal further comprises a voltage adjusting signal that relates to a desired output voltage set by a user, an output voltage of a power supply of the electronic cigarette is controlled according to the output voltage set by the user.

8. The method of claim 1, wherein the electronic cigarette comprises at least two indication lamps, each output mode corresponds to at least one indication lamp, the method comprises:

controlling the indication lamp corresponding to the current output mode to emit light with a breathing frequency to indicate a remaining voltage of the power supply.

9. The method of claim 1, further comprising:

detecting whether the coil breaks down; and stopping operating when the coil breaks down.

10. The method of claim 1, further comprising:

determining whether a time period for pressing a button is greater than a second preset time period during smoking; and stopping operating when the time period for pressing the button is greater than the second preset time period.

11. The method of claim 1, further comprising:

determining whether a lock-out signal is input when the electronic cigarette is powered on; and locking out the electronic cigarette in response to the lock-out signal.

12. An electronic cigarette with at least two output modes, comprising:

a memory for storing one of the output modes;

a button for inputting a switch signal for the stored output modes;

a first controller configured to:

detect whether the switch signal for the stored output modes is input when the electronic cigarette is in a locked state;

switch the stored output mode in response to the switch signal; and control the electronic cigarette to operate according to the stored output mode after being switched, and control an output of the electronic cigarette in response to a smoking request signal when the electronic cigarette is unlocked;

an adjustable resistor configured to be adjust to input a voltage adjusting signal relating to a desired output voltage set by a user;

a second controller configured to process the voltage adjusting signal; and a power supply;

the first controller further configured to control the output of the power supply according the output voltage set by the user in response to the voltage adjusting signal form the second controller.

13. The electronic cigarette of claim 12, wherein the first controller is further configured to:

determine whether a lock-out signal is input when the electronic cigarette is powered on; and lock out the electronic cigarette in response to the lock-out signal.

14. The electronic cigarette of claim 12, wherein the first controller is further configured to:

detect whether an unlock signal is input when the switch signal is not input; and unlock the electronic cigarette when the unlock signal is input, and detect the switch signal again when the unlock signal is not input.

15. The electronic cigarette of claim 12, wherein switch signal for the stored output modes is a button signal that is input by pressing a button of the electronic cigarette for a time period greater than or equal to a first preset time period.

16. The electronic cigarette of claim 12, wherein the first controller is configured to detect the smoking request signal when the switch signal is not input, and control the output of the electronic cigarette according to a detection signal from the second controller.

17. The electronic cigarette of claim 16, wherein each output mode corresponds to one indication information, the indication information corresponding to the stored output mode is output after the stored output mode has been switched.

* * * * *